June 29, 1971  YOICHI NAKAMURA ET AL  3,588,954
CONTINUOUS CROSSLINKING DEVICE FOR RUBBER OR PLASTIC CABLE
Filed Aug. 12, 1968  7 Sheets-Sheet 1

INVENTORS
YOICHI NAKAMURA
HIROKAZU MIYAUCHI
MICHIO FUKUDA
YASUO WAKABAYASHI

BY Sughrue, Rothwell, Mion,
Zinn & Macpeak
ATTORNEYS

United States Patent Office 3,588,954
Patented June 29, 1971

3,588,954
CONTINUOUS CROSSLINKING DEVICE FOR RUBBER OR PLASTIC CABLE
Yoichi Nakamura, Kamakura-shi, Michio Fukuda, Yokohama-shi, Hirokazu Miyauchi, Higashiosaka-shi, and Yasuo Wakabayashi, Settsu, Japan, assignors to Sumitomo Electric Industries, Ltd., Osaka, Japan
Filed Aug. 12, 1968, Ser. No. 751,979
Claims priority, application Japan, Aug. 10, 1967, 42/68,448; Aug. 11, 1967, 42/51,189, 42/68,830, 42/68,831, 42/68,832, 42/68,833; Aug. 12, 1967, 42/69,208
Int. Cl. B29h 5/24, 5/26, 5/28
U.S. Cl. 18—6
9 Claims

ABSTRACT OF THE DISCLOSURE

Conventional steam curing chamber employed in the curing system of electric cable insulation material, such as rubber and plastic, is replaced by a crosslinking tube having a radiant heating zone, a pre-cooling zone, and a cooling zone arranged in this order between a cable feeding device and a take-up device. The inside of the radiant heating zone and the pre-cooling zone is filled with an inert gas which does not oxidize the rubber or plastic covering of the cable.

BACKGROUND OF THE INVENTION (1) Field of the invention

It is well known that a crosslinking agent such as sulfur or an organic peroxide may be added to rubber or plastic such as polyethylene, and that the rubber or plastic is thereafter crosslinked by being heated for a predetermined period.

This invention relates to an improvement in the crosslinking device wherein the rubber or plastic covering of electric wires or cables aided by a crosslinking agent is to be cross-linked or cured.

(2) Description of the prior art

Heretofore, a typical crosslinking device for rubber or plastic material which is employed for the covering of electric cables or wires has comprised a curing chamber in which the electric cable or wire is guided. A high pressure saturated steam is directed onto the surface of the cable or wire through an entrance port so that the rubber or plastic is crosslinked in the chamber by the heat and pressure. Thereafter, cooling water is poured onto the surface of the cable through another inlet port.

In such devices utilizing saturated steam, the temperature and pressure could not be varied independently, and when a temperature of more than 200° C. is desired, the pressure of the saturated steam must be maintained at more than 15 kg./cm.² When the temperature is to be raised by 10° C., the pressure is also increased by 5 kg./cm.² This fact brought about a difficulty in the conventional device utilizing saturated steam when it is required to increase the rate of output length of cable per hour and economize the installation area and the production cost. Also, since the cooling water is in direct contact with the saturated steam, it is partly heated by the saturated steam, which deteriorates the cooling efficiency of the conventional device.

SUMMARY OF THE INVENTION

The present invention provides a novel type of curing chamber (hereinafter called crosslinking tube) wherein the electric cable or wire is heated by radiant heat within an inert gas atmosphere instead of the conventional saturated steam, whereby the heating temperature of the rubber or plastic covering of the cable is made freely controllable independent of the inside pressure of the crosslinking tube. Further, the radiant heating portion of the tube is completely separated from the cooling portion thereof by the provision of an intermediate pre-cooling zone within the crosslinking tube, whereby the cooling water guided through the cooling zone is prevented from intruding into the radiant heating zone of the crosslinking tube resulting in the protection of the life of the radiant heater and proper operation thereof.

Figures 1, 2:
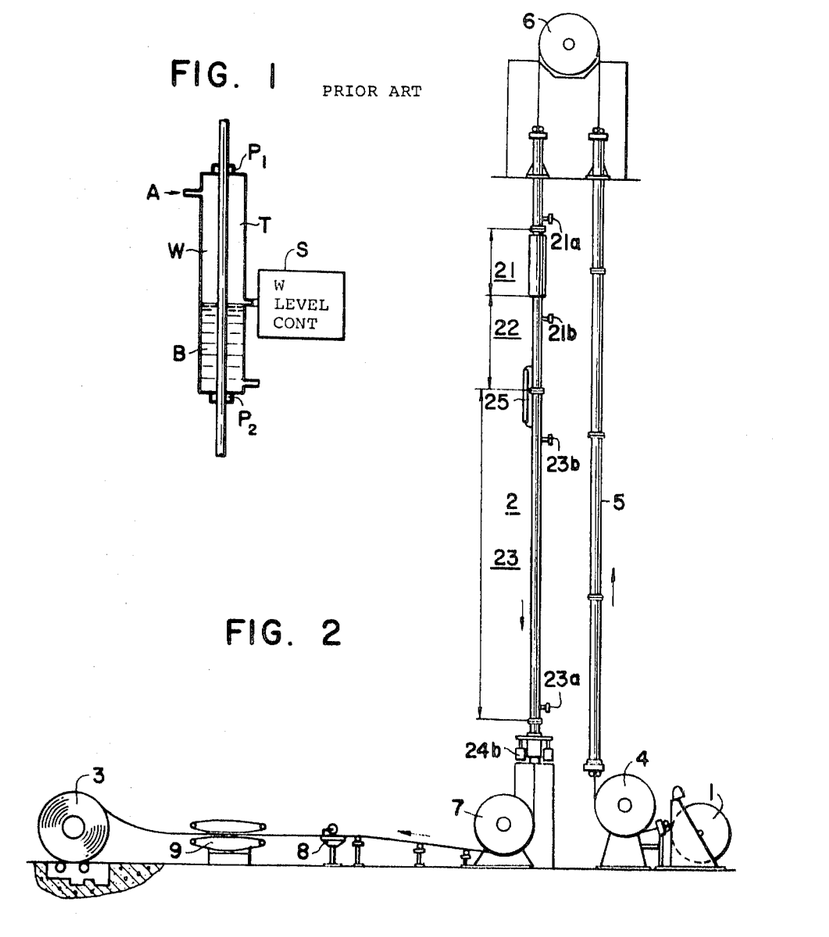
FIG. 1 is an elevational view of the conventional curing chamber for rubber or plastic coverings of electric cable or wire.
FIG. 2 is an elevational schematic view of an embodiment of a crosslinking device of the present invention.

Referring to FIG. 1 which illustrates a typical construction of the conventional curing chamber for rubber or plastic coverings of electric cable, it is shown for the convenience of explanation hereafter that the curing chamber T has a steam inlet port A through which saturated steam is guided onto the surface of a rubber or plastic insulated cable W. The cooling water B surrounds the lower portion of cable W. A water level controller S regulates the level of cooling water B. P1 and P2 designate gaskets provided at the lead-in portion and lead-out portion of curing chamber T.

Against the conventional construction of the curing chamber of FIG. 1, the conspicuous difference and the details of the crosslinking device according to the present invention will be revealed hereinafter with reference to the various types of the embodiments thereof.

In FIG. 2, which illustrates a vertical type of crosslinking device constituting one embodiment of this invention, there is shown a feeding device 1 for cable covered by rubber or plastic material to which has been added a crosslinking agent. A crosslinking tube 2 for crosslinking such covering, a coiling device 3 for the completed cable, and a turn-sheave 4 guiding the incompleted cable upwards are provided. A series of protecting tubes 5 for the incompleted cable, a cable lifting capstan 6, a turn-sheave 7 guiding the completed cable to the coiling device 3, a measuring device 8 for the completed cable, and another capstan 9 for the completed cable, and another capstan 9 for the completed cable are also provided. Crosslinking tube 2 comprises a radiant heating zone 21 located adjacent the lead-in portion of tube 2, a cooling zone 23 provided at the lead-out end of tube 2 and an intermediately located pre-cooling zone 22. Radiant heating zone 21 accommodates therein one or multiple layers of radiant heaters of, for instance, infrared ray type.

Inside of the radiant heating zone 21 and pre-cooling zone 22, there is sealed an inert gas such as nitrogen or carbon dioxide of more than 1 kg./cm.$^2$ and preferably within the range of 3 to 8 kg./cm.$^2$ for the purpose of preventing oxidation of the covering material of the cable such as polyethylene-butyl rubber or ethylene-propylene rubber, and also for suppressing the foaming effect due to the gas created at the time of the crosslinking the above-mentioned covering material. The inert gas may be circulated inside of the pre-cooling zone, so that the pre-cooling effect is thereby enhanced. In the drawing, 21a designates the inlet port and 21b designates the outlet port of the inert gas.

Inside of the cooling zone 23, there is ordinarily utilized a pressurized water corresponding to that of the inert gas, and such cooling water is furnished from an inlet port 23a at the lower portion of the zone 23 and exhausted from the outlet port 23b at the upper portion thereof. A liquid level indicator 25 is provided outside of the tube wall for the purpose of controlling the cooling water level, and sealing portions 24a, b are provided at the upper and lower ends of the crosslinking tube 2.

With this arrangement, the cable passing through the crosslinking tube 2 is heated under inert gas atmosphere, and the covering consisting of rubber and plastic is crosslinked. While the crosslinking of the cover in the conventional steam heating chamber was practically carried out at about 200° C., the heating temperature in the radiant heating zone can be raised independent of the pressure of the inert gas, and for this reason, the covering material can be crosslinked even at the temperature of 350° C. where the covering material is nearly dissociated. By this way, the crosslinking speed of the covering amterial can be significantly raised and speed of feed of the cable is also conspicuously accelerated.

Figures 3, 6:
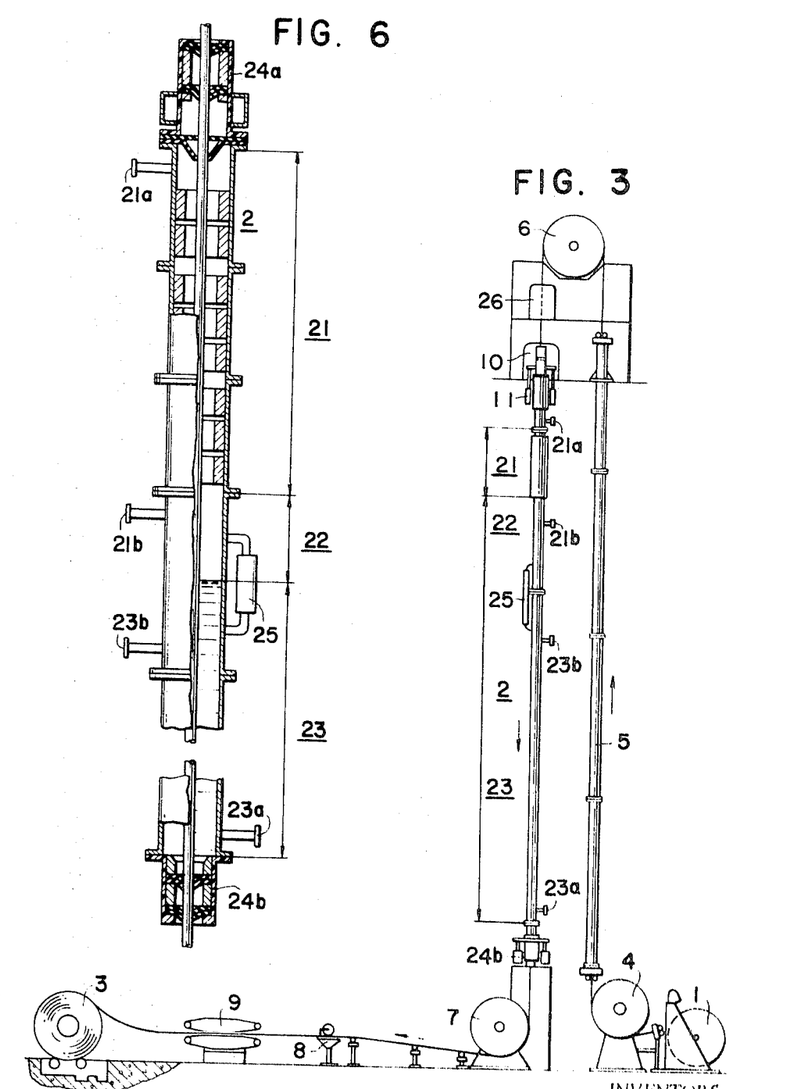
FIG. 3 is an elevational schematic view of another embodiment of the crosslinking device.
FIGS. 6, 7, 8 and 9 are elevational schematic views showing various types of crosslinking tubes, totally or partly in cross section, which constitute one part of the crosslinking device according to this invention.

The pre-cooling zone 22 is provided between radiant heating zone 21 and cooling zone 23 as shown in FIGS. 2 and 6 for the following reasons. If the covered cable which has been heated to a high temperature in radiant heating zone 21 is brought directly into the cooling zone, the heat of the cable not only warms up the cooling water therein, but the steam generated in the cooling zone 23 intrudes inside of heating zone 21 resulting in a lowering of the heating efficiency and the formation of dew around the heater wires when the power source is interrupted which inevitably caused failure of the heating device. Pre-cooling zone 22 is provided in order to prevent the above-described drawbacks, and cable led out from heating zone 21 is once passed through the pre-cooling zone 22 to be cooled down in some extent and thereafter guided into cooling zone 23.

Comparing the crosslinking speed of the cable covering obtained in the crosslinking device according to the present invention with that of the conventional steam heating method, the following results are observed:

Tested cable: 6 kv. crosslinked polyethylene cable.

| Conductor size | Required times for the crosslinking process, min. | | Ratio |
| --- | --- | --- | --- |
| | This invention | Steam method | |
| 50 mm.$^2$ | 1.7 | 7.0 | 1/4.1 |
| 14 mm.$^2$ | 1.3 | 5.6 | 1/4.3 |
| 3 mm.$^2$ | 0.8 | 4.0 | 1/5.0 |

From the above results, it is apparent that the required time period for the crosslinking operation in accordance with the present invention could be shortened by about ¼ from that of the conventional method.

FIG. 3 illustrates another embodiment of the present invention which is similar to the above-described embodiment except that only the conductor of the cable is furnished from the feeding device 1, while an extrusion device 10 for the rubber or plastic material is connected to the end of the crosslinking tube 2 through a splice box 11, whereby the covering material is extruded onto the conductor and crosslinked in one series of operation. In this case, the upper seal 24 of the crosslinking tube 2 can be eliminated.

Figure 4:
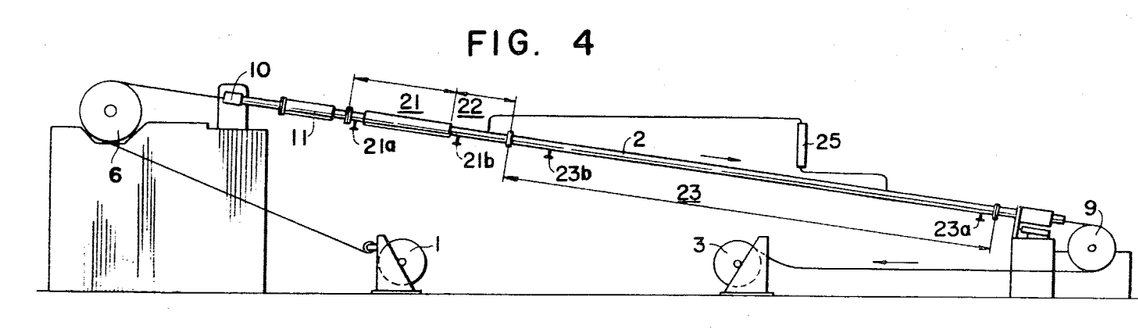
FIGS. 4 and 5 are elevational schematic views of horizontal and vertical types of crosslinking devices, respectively, which constitute still further embodiments of the present invention.

FIG. 4 illustrates a horizontal type embodiment of the present invention. Although the whole components thereof are arranged horizontally, the concept of construction is similar to the embodiments shown in FIG. 2 and FIG. 3.

Figures 5, 7:
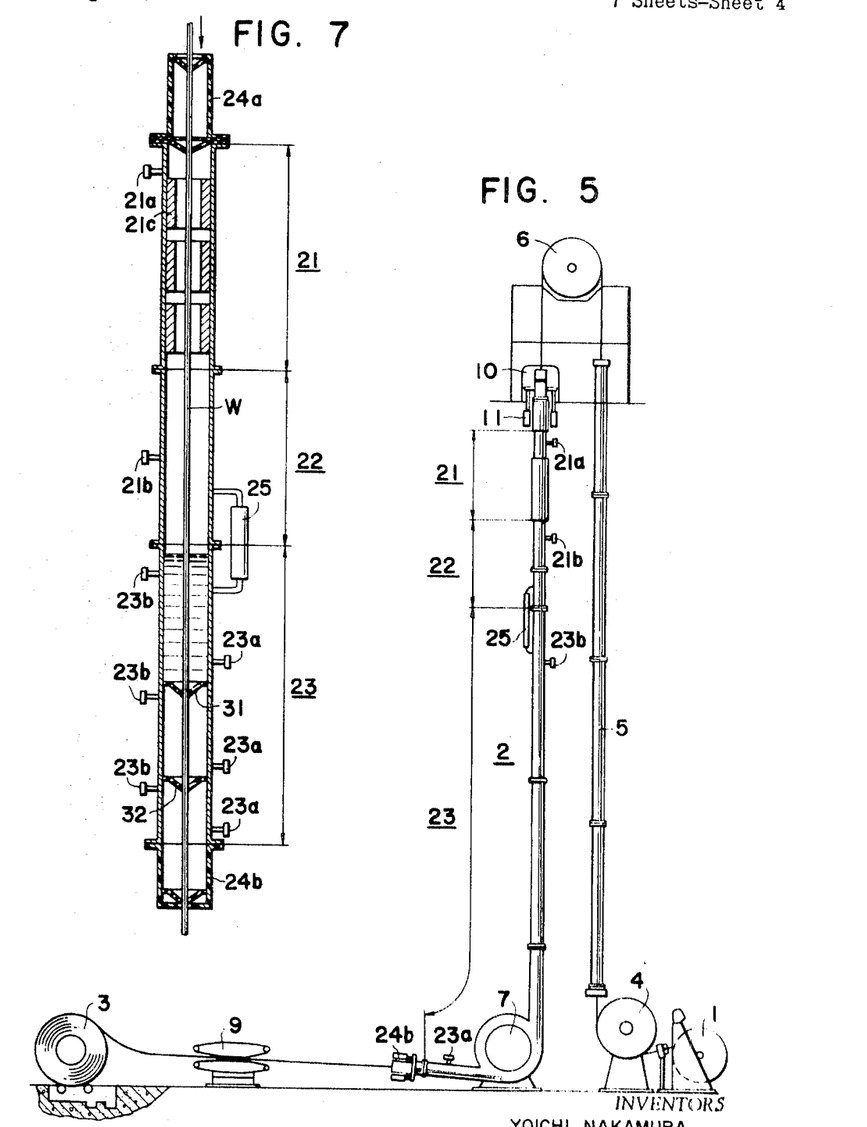

FIG. 5 illustrates a vertical type embodiment of the present invention wherein only the conductor of the cable is furnished from the feeding device 1 and the rubber plastic covering material is extruded on the conductor from the extrusion device 10.

Although in the above-described embodiments in conjunction with FIGS. 2, 3, 4 and 5, only the vertical and horizontal types thereof are indicated, it is apparent that the present invention is not limited in these two types and the horizontal straight line type or inclined type can be utilized as well as the above two types.

Furthermore, it is also possible to provide a pre-heating means within the device so that the crosslinking speed therein may be promoted still more. That is, the conductor is preheated to eliminate the time lag which exists when the covering material of the cable is merely heated from the outside. In that case, the near conductor portion of the insulating covering could not follow the quick temperature rise of the outer surface of the cover, which is heated for instance, into a range of 250° C. to 350° C., and this time lag retarded the crosslinking speed of such material. This preheating means may be provided on cable lifting capstan 6 or on the intermediate portion of the passage from capstan 6 to extruding device 10. In FIG. 3, such preheating means is indicated as a heater 26 surrounding the conductor.

In FIG. 5, there are also shown a feeding device 1 of the conductor, a crosslinking tube 2, a coiling device 3, for the completed cable, a turn-sheave 4 guiding the conductor upwards, a series of protecting tubes 5 for the conductor, a conductor lifting capstan 6, an extrusion device 10 which extrudes the rubber plastic added by a crosslinking agent on the conductor, and a completion side capstan 8. Crosslinking tube 2 is connected with the extruder 10 through a splice box 11 and arranged in vertical position. Crosslinking tube 2 is composed of radiant heating zone 21, pre-cooling zone 22, and a cooling zone arranged in this order from the inlet side to the outlet side.

Radiant heating zone 21 includes therein a plurality of heating sources such as radiant heaters, and is provided with an inlet port 21a and outlet port 21b for the inert gas. Cooling zone 23 is disposed vertically succeeding from precooling zone 22, and includes a water immersed turn-sheave 7 at the lower portion thereof. The cooling zone 23 is thus bent in horizontal direction, provided with an inlet port 23a for the pressurized cooling water at the lower end and an outlet port 23b for the same water at the upper end, and equipped with a liquid level indicator 25 to control the level of the cooling water. At the outlet side end of the cooling zone, a seal 24b is also provided.

When the increase of the crosslinking speed of the cable is required, it will be necessary not only to increase the crosslinking speed but also to increase the cooling speed or the length of the cooling portion is lengthened. Since there is a problem in the increase of the cooling speed in view of the selection of the cooling medium and other installation requirements, the most simple solution would be the extension of the cooling portion. However, merely extending the height of the cooling portion vertically disposed will also increase the initial installation cost of this kind of device, and if it is the horizontal type, the extension of the cooling portion will increase the floor area. In such a case, if a water immersed turn-sheave is utilized as in this embodiment and the cooling portion is suitably extended in horizontal direction, the length of the cooling portion can be elongated with the height constant and considerably little increase of the floor space.

In the crosslinking devices constituting embodiments of the present invention, it is found that the ratio of the lengths of the radiant heating zone, pre-cooling zone, and cooling zone as shown for instance in FIG. 5 is advantageously determined as: 1:more than 5/100:more than ½, respectively. In other words, the provision of non-heating portions of more than 5/100 of the length of the radiant heating zone serves to suppress the formation of foam in the covering material, to reduce the amount of steam generated when the high temperature cable led into the cooling water, to condensate part of the steam so that the intrusion thereof into the heating zone is prevented, and to eliminate troubles such as lowering of the radiation efficiency of the heat sources and short-circuiting of the related electrical circuits.

Provision of the cooling portion of more than ½ of the heating portion also helps to suppress creation of foam, and sufficiently cools down the cable or the like linear body so that the deformation thereof at the time of coiling is effectively prevented.

To simplify the construction of the sealing end of the cooling portion, multiple stages of gaskets are provided along the lengthwise direction, so that the water pressure born by the stages of the sealing portion are gradually decreased toward the lead-out end of the sealing portion.

In FIG. 7, there are indicated a radiant heating zone 21 inside of which is provided a heating device 21c, a pre-cooling zone 22, a cooling zone 23, a sealing portion 24a at the inlet side of the cable, a sealing portion 24b at the outlet side of the cable, an inert gas inlet port 21a, an inert gas outlet port 21b, a cooling water inlet port 23a, a cooling water exhaust port 23b, a liquid level indicator 25 for the cooling water control, and the cable W.

In the cooling zone 23 of such an embodiment of the crosslinking tube, a plurality of stages of gaskets 31, 32 are provided, and the water pressure is applied in such a manner that, for instance, 10 kg./cm.$^2$ is applied to the upper stage of the gasket, 5 kg./cm.$^2$ is applied to the middle stage thereof, and 2 to 3 kg./cm.$^2$ is applied to the lower stage of the gasket. By this way, the construction of the end seal 24b can be much simplified.

Figure 8:
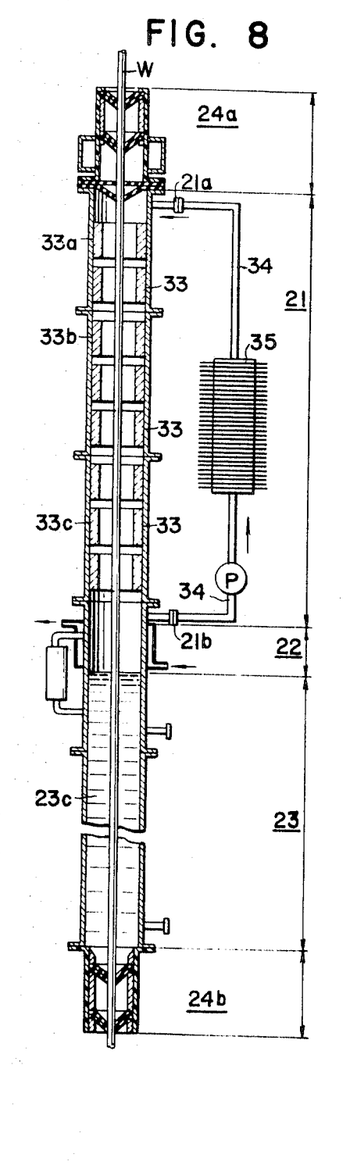

In the similar embodiment of the crosslinking tube shown in FIG. 8, a not yet crosslinked rubber plastic cable W is led into the crosslinking tube 2 through its supply side sealing portion 24a. The heating portion 21 of the crosslinking tube 2 is composed of a heat insulator, a reflector plate, and heater 33 disposed in this order from the outside. As shown in the drawing, the heater 33 may be separated into unit sections 33a, 33b, 33c so that they may be replaced easily when some of the heaters are broken. The cable led through crosslinking tube 2 is heated by radiant heater 33. To prevent generation of foam during the crosslinking reaction, an inert gas such as nitrogen or carbon dioxide of more than 1 kg./cm.$^2$ pressure is circulated inside of heating zone 21. The circulation is effectuated through upper inlet port 21a and lower outlet port 21b which are connected by a section of piping 34 and driven by a pump P. Within the circulation path, for instance, a fin type condenser 35 may be provided.

The cable W heated up by the heater 33 in the heating zone 21 is crosslinked, and thus crosslinked cable is fed through the pre-cooling zone 22, cooling zone 23, and take-up side sealing portion 24b to the outside of the crosslinking tube 2. When the cable heated up in the heating zone 21 to about 350° C. is guided through cooling water 23c within cooling zone 23, the temperature of the cooling water goes up and steam is generated in cooling zone 23. Although most of the steam can be removed in pre-cooling zone 22, some of the steam may intrude into heating zone 21 and there is a fear that heater 33 might be damaged or the insulation of heater zone 21 be deteriorated. The circulation of the inert gas by means of pump P and the provision of condenser 35 in circulation passage 34 will condensate and remove the intruded steam, and by the condensating action, the inert gas is also cooled.

As described above, the embodiment of the present invention including the crosslinking tube which is provided with a circulation path for the inert gas and a condensating device in that path can remove the steam intruded into the heating zone 21 completely and the risk of damaging the heater or deteriorating the insulation is utterly eliminated.

Figure 9:
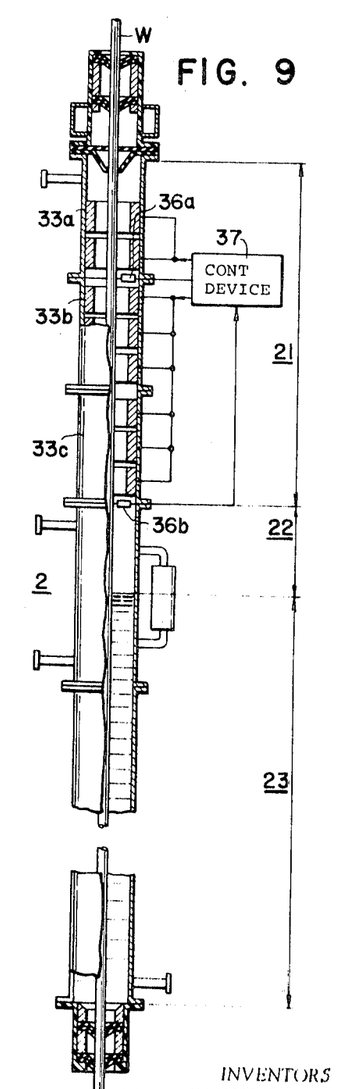

In still another embodiment of the crosslinking tube illustrated in FIG. 9, there are indicated a radiant heating zone 21, a pre-cooling zone 22, a cooling zone 23, which constitute the crosslinking tube 2. The not yet crosslinked cable W guided into the radiant heating zone 21 is heated in the atmosphere of an inert gas such as $N_2$, $CO_2$ of more than 1 kg./cm.$^2$ pressure, cooled down within the pre-cooling zone 22 and the cooling zone 23, whereby the crosslinking reaction is completed.

The radiant heating zone 21 includes sequentially disposed heater sections 33a, 33b, 33c and the first stage heater 33a (the stage 33a in the drawing consists of two heater units) has at its outlet side a temperature detecting element 36a. The output from temperature detecting element 36a is fed back to a control device 37, and the temperature of the heater 33a is maintained at a predetermined value, so selected that it is lower than the heat dissociation temperature of the rubber plastic covering material of the cable W which passes through the crosslinking tube 2, but it is high enough to cause the crosslinking reaction in the rubber plastic material.

At the outlet side of the last stage heater 33c (in the drawing, this is indicated to be composed of three units), another temperature detecting element 36b is provided, the output of which is also fed back to the control device 37, whereby the heating temperature of the second and the third stages of the heater sections 33b, 33c are controlled. The temperature of second and third heater sections 33b, 33c is so determined that it is maintained at the temperature present for the first stage heater section 33a only while it is required for the completion of the crosslinking reaction of the covering material. In the illustrated example, the first stage heater section is so arranged that it heats the cable covering to a required temperature for creating the reaction, and the second and third stages of the heater sections are made to maintain the temperature of the cable covering. However, it is also possible that, when there are more than three stages of the heater sections, the first stage and the second stage are assembled into the first group which is to be employed for heating up the cable covering to the required temperature for the crosslinking, and the rest of the heater stages are used for maintaining the temperature. So, it should be noted that the division of the heater sections, the grouping of these sections, and determination of heating capacities of these sections can be carried out suitably depending on the material of the covering, size of the cable, and the required cable speed.

Figure 10A:
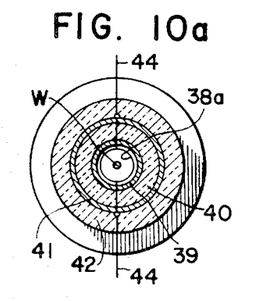
FIGS. 10(a), (b) and (c) illustate various types of heater portions employed in one part of the crosslinking tube of this invention.

The heater sections are made of Nichrome wire or sheath heater wire wound into helical form for instance as shown in FIG. 10(a) by the heater 38, and at the central portion of the heater 38 the cable W is led through. Outside of the heater 38, there is provided a reflecting plate 39 consisting of a metal plate coated or plated by gold, silver, etc. or a stainless steel plate. Further outside of the reflecting plate 39, there are concentrically provided a heat insulating layer 40 and a protecting tube 41. Another heat insulating layer 42 outside of the protecting tube 41 may be provided. Numeral 43 designates a heat interrupting plate. From suitable positions of the heater 38 spaced apart between each other, taps 44 are spliced out, and it would be economical if one portion of the heater sections is made replaceable when the heater must be adjusted or that portion of the heater is broken.

Figure 10B:
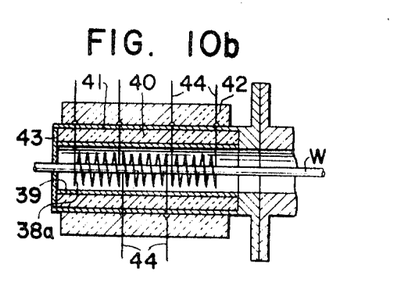
Figure 10C:
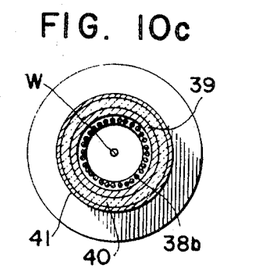
Figure 10D:
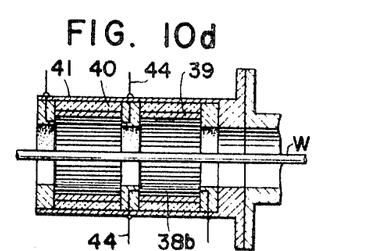
Figure 10E:
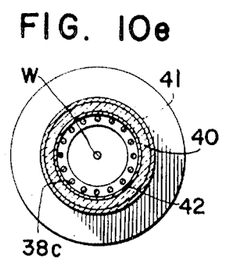
Figure 10F:
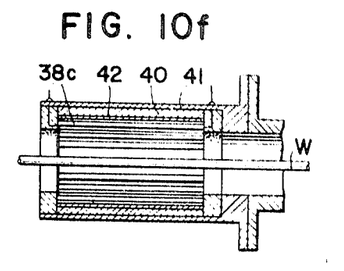

FIGS. 10(b) and 10(c) illustrate other embodiments of the heater sections, and in FIG. 10(b) bar type heaters 38b are arranged in a circular configuration, and on the outer circumferences from the reflecting plate 39, a heat insulating layer 40 and a protecting tube 41 are successively provided. On this heater, a plurality of taps are provided as in the case of the heaters in FIG. 10(a) and partial replacement or adjustment is thereby made possible.

Figure 11:
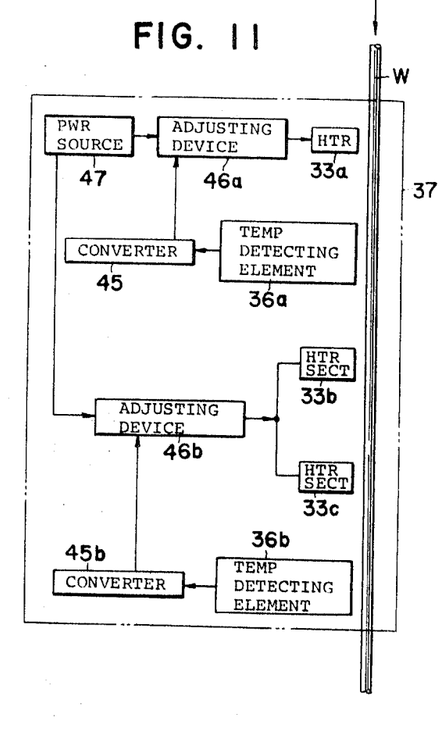
FIG. 11 is a block-diagram of temperature control unit utilized in the crosslinking device of this invention.

FIG. 11 is a block diagram of one example of the temperature control device 37, wherein the output of the temperature detecting element 36a provided at the leadout side of the heater section 33a is fed back to an adjusting device 46a through a converter 45a and the electric power furnished from a power source 47 to the heater 33a is thereby adjusted automatically. Similarly, the output from a temperature detecting element 36b provided at the lead-out portion of the heater section of the last stage is fed back to an adjusting device 46b through a converter 45b, whereby the electric power furnished from the power source 47 to the heater sections 33b and 33c is adjusted automatically. Of course, the automatic temperature control of the heater sections is not always necessary and in some cases the control may be carried out manually. In that case, it is apparent that control device 37 can be replaced by an ordinary thermometer.

As described above, the heating portion according to this invention is composed of a plurality of stages of the heater section, these heater sections being assembled into a first and second group. The first group is disposed at the entrance side of the heating portion and can be controlled accurately so that the group heats up the cable covering to the temperature which is high enough to cause the crosslinking reaction within the covering material, and the second group of the heater sections is controlled so that it precisely maintains the above-described temperature for a period required for the completion of the crosslinking reaction. In this way, the temperature of the outer covering of the cable can be maintained at a value which is safely below the temperature of dissociation of the covering material, and the crosslinking reaction is thereby promoted.

Figure 12:
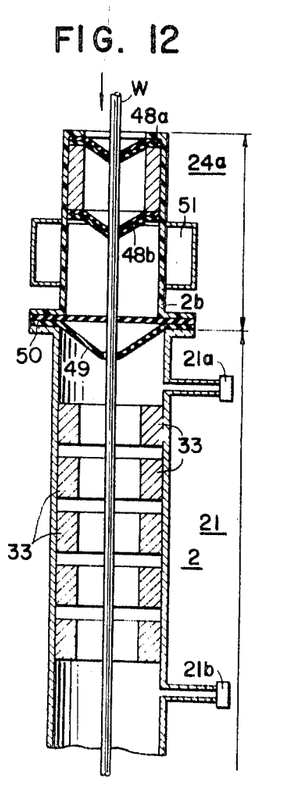
FIG. 12 is a cross-sectional view showing the lead-in portion and one part of the heater portion adjacent thereto of the crosslinking tube.

FIG. 12 is a cross sectional view showing the lead-in portion 24a and a part of the following heating portion 21 of a crosslinking tube according to the present invention. In the drawing, W designates a cable or the like having a covering consisting of rubber or plastic material passing into the heating portion, and numerals 48a, 48b designate a gasket member composed of a fiberic cloth and a rubber sheet laminated together. The gasket member should be of such nature enabling it to surround the cable to afford a seal against leakage of the inside pressurized gas and to resist against the frictional wear caused by the cable or the like linear body passing therethrough. Although two stages of the gasket members arranged in upper and lower relationship are indicated in the drawing, the number of gaskets may be varied according to the pressure of the inert gas and the surface condition of the cable or the like linear body. Numeral 49 designates a reflecting plate consisting of a single or composite metal plate surrounding the linear body so that it may reflect the infra-red ray radiated from heater 33. Numeral 50 designates a heat insulator such as asbestos which is employed to interrupt transmission of heat from protecting tube 2 to protecting tube 2b, and to prevent the gasket members from being early damaged by the transmitted heat. Numeral 51 designates a water-cooling portion also provided for the same purpose to cool down the protecting tube 2b. Numeral 21a designates an inlet port for the pressurized gas and numeral 21b designates an outlet port for the same gas.

As is described above, the lead-in portion according to this invention provided adjacent heating portion 21 wherein a linear body consisting of rubber or plastic is radiantly heated while it is shifted therethrough is characterized by that it comprises gasket members surrounding the linear body passing therethrough and affording a seal against the leakage of said pressurized gas, and a reflector plate disposed around the linear body in a position wherefrom it can reflect the infra-red ray radiated from the radiant heater.

The gasket member can effectuate enough seal at the contacting portion with a moving linear body against a pressurized gas in a range ordinarily from 1 kg./cm.$^2$ to 5 kg./cm.$^2$, and the reflector can reflect the infra-red ray from the radiant heater in order that the temperature rise of the lead-in portion is thereby prevented and said gasket members are thereby effectively protected from the harmful effect thereof.

The invention has been described with reference to particular embodiments thereof. However, it is to be understood that other changes and advantages will be apparent to those skilled in the art within the spirit and scope of the appended claims.

What is claimed is:

1. A crosslinking device for rubber or plastic covered cable or wire comprising:
   (a) means to feed said rubber or plastic covered cable or wire,
   (b) a crosslinking tube for crosslinking said rubber or plastic covered cable or wire having:
      (1) an inert gas filled radiant heating zone near said feeding means,
      (2) a liquid cooling zone, and
      (3) an inert gas filled pre-cooling zone intermediate said heating and cooling zones; and
   (c) said crosslinking tube defining an uninterrupted passage allowing fluid communication between said zones in said given order; and
   (d) a coiling device near said cooling zone for taking-up the completed cable.

2. A crosslinking device as defined in claim 1 further comprising an extruding device which extrudes and covers the rubber or plastic material to which has been added a crosslinking agent on said cable or wire, said extruding device being connected to said crosslinking tube.

3. A crosslinking device as defined in claim 2 further comprising a pre-heating device before said crosslinking tube and wherein said inert gas is at a pressure of more than 1.0 kg./cm.$^2$.

4. A crosslinking device as defined in claim 2 wherein said feeding means includes a lifting device for said cable or wire and said cooling zone includes a water immersed turn-sheave and is extended in a horizontal direction.

5. A crosslinking device as defined in claim 1, wherein the ratio of the lengths of said radiant heating zone, pre-cooling zone, and cooling zone is 1:more than 5/100:more than ½.

6. A crosslinking device as defined in claim 1, wherein a plurality of stages of gaskets are provided at the end of and along the length of said cooling zone, so that the water pressure at the end portion is gradually decreased toward the lead-out end of the cooling zone.

7. A crosslinking device as defined in claim 1 further comprising gas circulating means including a condenser at said heating zone.

8. A crosslinking device as defined in claim 1 wherein said radiant heating zone includes a plurality of heater sections divided into at least two groups; and further comprising a temperature detector at the outlet side of each of said heater groups, the input electric power for each group of said radiant heater sections being controlled by the output of said temperature detecting elements.

9. A crosslinking device as defined in claim 1 further comprising a guide-in portion for said cable or wire at the entrance of said radiant heating zone; a plurality of gaskets for sealing said inert gas inside that zone; and a reflecting member to reflect back infrared rays generated from that zone, said gaskets and reflecting member being disposed in said guide portion so as to surround said cable or wire.

References Cited

UNITED STATES PATENTS

| | | | |
|---|---|---|---|
| 1,999,751 | 4/1935 | Clayton | 18—6(C) |
| 2,023,665 | 12/1935 | Clayton | 18—6(C)X |
| 2,545,729 | 3/1951 | Everett | 18—6(C)X |
| 2,581,255 | 1/1952 | Henning | 18—6(C)X |
| 2,608,718 | 9/1952 | Berggren | 18—6(C) |
| 2,825,091 | 4/1958 | Burley | 18—6(C)X |
| 2,952,870 | 9/1960 | Mark | 18—6(C) |

OTHER REFERENCES

Rubber Age, April 1959, pp. 88–90, Ben H. Davis.

J. SPENCER OVERHOLSER, Primary Examiner

R. L. SPICER, Jr., Assistant Examiner

U.S. Cl. X.R.

18—1